United States Patent
Bianco

[15] 3,676,897
[45] July 18, 1972

[54] MECHANISM FOR FORMING A SUBSTANTIALLY SPHERICAL COMESTIBLE PRODUCT

[72] Inventor: Archangel J. Bianco, Box 93, Brookside, N.J. 07926

[22] Filed: June 11, 1970

[21] Appl. No.: 57,021

[52] U.S. Cl. .................................................................17/32
[51] Int. Cl. ..............................................................A22c 7/00
[58] Field of Search......................................................17/32

[56] References Cited

UNITED STATES PATENTS

| | | | |
|---|---|---|---|
| 2,099,638 | 11/1937 | Wiley | 17/32 |
| 2,933,758 | 4/1960 | Moule | 17/32 |

FOREIGN PATENTS OR APPLICATIONS

| | | | |
|---|---|---|---|
| 56,030 | 2/1924 | Sweden | 17/32 |

*Primary Examiner*—Lucie H. Laudenslager
*Attorney*—Marvin Trimas

[57] ABSTRACT

A comestible product which is formed rapidly in a mold in the shape of a meatball. The mold cavities are contiguous and the meatballs produced thereby are directly connected to each other without a separate connecting member. The comestible product can be cooked in the mold also by applying heat directly to the mold.

In order to make meatballs on a commercial as distinguished from a domestic scale, the processor takes ground meat and rolls and pats it into a ball. The meatball is then cooked in a pan. The disadvantages of making meatballs in this fashion are that (1) the meatballs are not the same size, (2) the amount of meat varies from one meatball to the next, (3) the density of the meatballs varies, and (4) the juices are lost when the meatball is cooked and (5) the amount of time lost in making meatballs by hand is excessive.

4 Claims, 7 Drawing Figures

Patented July 18, 1972
3,676,897
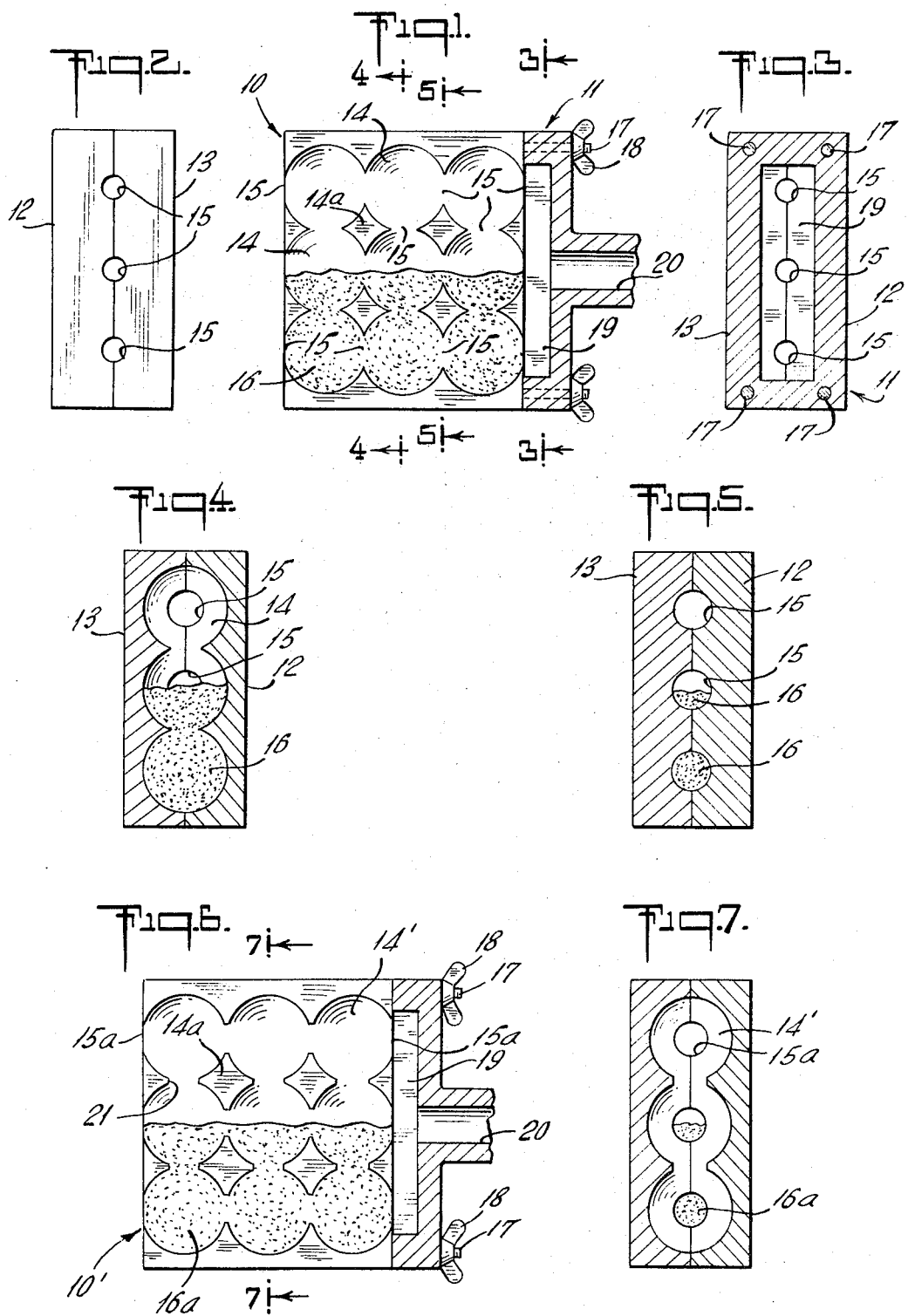
INVENTOR
ARCHANGEL J. BIANCO
BY
ATTORNEY

MECHANISM FOR FORMING A SUBSTANTIALLY SPHERICAL COMESTIBLE PRODUCT

The present invention overcomes these disadvantages by providing a mold whereby ground meat is injected into a mold having cavities therein which are located within the mold so as to produce a meatball which overlaps the adjacent meatball and is thereby connected thereto. In using the mold, the operator injects ground meat under pressure into the mold and the cavities in the mold are filled with the meat. The number of cavities chosen is a matter of choice. After the meat has been extruded into the mold, the mold is placed in an oven or a stove and the meat is cooked directly in the mold. Since the outside surface of the meatball is heated first, the crust of the meatball is seared thereby retaining the juices therein which imparts a fine taste to the meatball.

After the meatball has been cooked, the user cuts the connection between the meatballs and they can be packaged or served to a customer. Naturally, the meatballs can be marketed in either a cooked or an uncooked condition. The advantages of the present invention reside primarily in the ability to overcome the disadvantages itemized above. For example, (1) the mold makes all meatballs the identical size, (2) the amount of meat in each meatball is the same, (3) the density of each meatball is the same, (4) the juices are not lost because the meat is seared, and (5) meatballs are made very quickly.

It is therefore a principal object of the invention to provide a mold for making meatballs in which the mold also serves as a cooking utensil.

It is a further object of the invention to provide a mold for making meatballs in which the meatballs overlap.

It is another object of the invention to provide a mold for making meatballs which is simple to operate and economical to fabricate.

Further objects and advantages of the present invention will become apparent as the following description proceeds, and the features of novelty which characterize the invention will be pointed out with particularity in the claims annexed to and forming a part of this invention.

For a better understanding of the present invention, reference may be had to the accompanying drawings in which:

FIG. 1 is a plan view partly in section showing a mold and a manifold used therewith;

FIG. 2 is a left side view of the mold;

FIG. 3 is a view taken along the line 3—3 in FIG. 1;

FIG. 4 is a view taken along the line 4—4 in FIG. 1;

FIG. 5 is a view taken along the line 5—5 in FIG. 1;

FIG. 6 is a second embodiment of the invention, and

FIG. 7 is a left side view of the second embodiment.

Referring now to the drawings, in FIG. 1 there is depicted a mold 10 and a manifold 11 clamped thereon. The mold 10 is formed in two halves 12 and 13 respectively. The mold halves are preferably constructed of metal, however, any known desired material can be used.

Formed within each half of the mold are a plurality of walls forming cavities 14. Nine are shown, however, any desired number can be incorporated into the mold 10. Each of the cavities 14 in the mold moiety 12 mates with a corresponding cavity in the mold 13. It will be noted, however, that each cavity 14 has the wall between cavities broken so as to form a planar opening 15 therebetween. Thus, when a comestible product such as the meatball 16 fills the cavity 14, there is an overlap of approximately 0.25 inches. A substantially diamond shape 14a is formed between the cavities 14.

A manifold 11 is secured to one sidewall of the mold halves by any known attaching means such as threaded studs 17 and wingnuts 18. A seal can be used between the mold halves and the manifold or the latter can be avoided by utilizing sufficient clamping pressure. The manifold 11 can have an open central portion 19 or it can be formed with individual passageways (not shown) which directly lead into the openings 15 in the sidewall portion of the mold 10. A central bore 20 leads into the open central portion of the manifold 11 and serves as a conduit for the transfer of the comestible product. The comestible product is forced through the bore 20 by a pressurizing means such as a cylinder having a piston therein (not shown) which bears on the comestible product thereby forcing it through the bore 20 into the central portion 19 or passageways and thence into the openings 15, whereupon the comestible product fills the cavities 14.

In the embodiment illustrated in FIGS. 6 and 7, the molds are basically the same as the embodiment depicted in FIGS. 1 to 5. The difference between the embodiments is in the cavities. The cavities 14 do not intersect an adjacent cavity thus a perfect spherical meatball 16a can be formed. A connecting sprue 21 links each cavity together whereby the comestible product will flow from one cavity to the other after the comestible food is forcefully injected into the openings 15a.

While there has been shown and described a single embodiment of the invention, it will be obvious to those skilled in the art that changes and modifications may be made without departing from the invention, and that it is intended by the appended claims to cover all such changes and modifications as fall within the true spirit and scope of the invention.

What is claimed as new and desired to be secured by Letters Patent of the United States is:

1. A mold for producing a plurality of abutting substantially spherical comestible products comprising,
   a. a mold housing formed by separate mold halves,
   b. identical walls, in each half of the mold housing, forming a plurality of contiguous cavities arranged in the mold housing,
   c. the walls forming each cavity are located in each half of the mold housing such that an arc of the wall forming one cavity overlaps an arc of the wall forming an adjacent cavity whereby a substantially planar opening is formed between cavities,
      i. whereby injection of said comestible product into the mold housing causes the comestible product to flow through the substantially planar openings and fill each cavity thereby producing a plurality of abutting comestible products.

2. A mechanism for producing a substantially spherical comestible product as defined in claim 1 further comprising sidewall portions having openings therein adjacent the cavities contiguous with said sidewall portions whereby the comestible product can be injected into said openings.

3. A mechanism for producing a substantially spherical comestible product as defined in claim 2 further comprising a manifold rigidly secured to said sidewall of said mold, said manifold having an open portion and a bore leading into said open portion whereby a comestible product can be forcefully injected into said bore in said manifold.

4. A mechanism for producing a substantially spherical comestible product as defined in claim 1 in which the non-intersecting portions between the cavities form a substantially diamond shaped configuration.

* * * * *